United States Patent
Damen et al.

(10) Patent No.: US 12,027,990 B2
(45) Date of Patent: Jul. 2, 2024

(54) AC TO DC CONVERTER FOR ELECTROLYSIS

(71) Applicant: HyGro Technology B.V., Haren (NL)

(72) Inventors: Michiel Eduard Cornelis Damen, The Hague (NL); Johannes Hubertus Guliëlma Hendricus Groenemans, Haren (NL)

(73) Assignee: HyGro Technology B.V., Haren (NL)

(*) Notice: Subject to any disclaimer, the term of this patent is extended or adjusted under 35 U.S.C. 154(b) by 72 days.

(21) Appl. No.: 17/799,423

(22) PCT Filed: Feb. 12, 2021

(86) PCT No.: PCT/NL2021/050095
§ 371 (c)(1),
(2) Date: Aug. 12, 2022

(87) PCT Pub. No.: WO2021/162553
PCT Pub. Date: Aug. 19, 2021

(65) Prior Publication Data
US 2023/0140438 A1 May 4, 2023

(30) Foreign Application Priority Data

Feb. 14, 2020 (NL) .................................... 2024916
Feb. 14, 2020 (NL) .................................... 2024917

(51) Int. Cl.
*H02M 7/219* (2006.01)
*C25B 1/04* (2021.01)
(Continued)

(52) U.S. Cl.
CPC .............. *H02M 7/219* (2013.01); *C25B 1/04* (2013.01); *C25B 9/65* (2021.01); *C25B 15/023* (2021.01);
(Continued)

(58) Field of Classification Search
CPC ...................................................... H02M 7/219
(Continued)

(56) References Cited

U.S. PATENT DOCUMENTS 11,031,781 B1* 6/2021 Zanone .................. H02S 10/20
2012/0057385 A1* 3/2012 Hsu ..................... H02M 7/5395
363/131

FOREIGN PATENT DOCUMENTS

EP 2963761 A1 1/2016
KR 101655134 B1 9/2016
WO 2015135073 A1 9/2015

OTHER PUBLICATIONS

International Search Report and Written Opinion—PCT/NL2021/050095—mailing date Aug. 19, 2021.
(Continued)

*Primary Examiner* — Joseph Chang
(74) *Attorney, Agent, or Firm* — Banner & Witcoff, Ltd.

(57) ABSTRACT

An alternating current AC to direct current DC converting circuit for a turbine generator is provided that comprises an active AC/DC converter having a controllable output voltage level having an input for receiving alternating current electrical power from a turbine generator and an output for providing direct current electrical power to an electrolysis system for electrolysis of water. The AC to DC converter further comprises an oscillator for generating an alternating current auxiliary signal and a summation circuit for adding the alternating current signal to the output of the active AC DC converter. By adding an AC component to the DC output of the active AC DC converter, electrolysis cells in the electrolysis module connected to the AC DC converting circuit have been proven to operate more efficiently. The amplitude of the alternating current auxiliary signal is preferably less than the output voltage of the active AC/DC converter.

18 Claims, 4 Drawing Sheets

(51) Int. Cl.
    *C25B 9/65*     (2021.01)
    *C25B 15/023*   (2021.01)
    *C25B 15/027*   (2021.01)
    *G01L 19/00*    (2006.01)
    *H02M 1/14*     (2006.01)
(52) U.S. Cl.
    CPC ........ *C25B 15/027* (2021.01); *G01L 19/0092* (2013.01); *H02M 1/14* (2013.01)
(58) Field of Classification Search
    USPC .......................................................... 307/11
    See application file for complete search history.

(56) References Cited

OTHER PUBLICATIONS

XP027937651 (De Battista H et al; J. Power Sources; deel 155, nr. 2; (2006); 478-486).
XP33719305AI XP033719305 (Bintz Steffen et al; 2019 IEEE 13th International Conference on Power Electronics and Drive Systems; (2019); 1-7).
XP033665765 (Bintz Steffen et al; 2019 21st European Conference on Power Electronics and Applications; (2019)).
XP031956379. Chikaraishi H et al: "Study of low ripple Dc power supply for superconducting coils", May 30, 2011 (May 30, 2011), pp. 2860-2865.

* cited by examiner

AC TO DC CONVERTER FOR ELECTROLYSIS

CROSS-REFERENCE TO RELATED APPLICATIONS

This application is a U.S. National Stage application under 35 U.S.C. § 371 of International Application PCT/NL2021/050095 (published as WO 2021/162553 A1), filed Feb. 12, 2021 which claims the benefit of priority to Application NL 2024916, filed Feb. 14, 2020 and to Application NL 2024917, filed Feb. 14, 2020. Benefit of the filing date of these prior applications is hereby claimed. Each of these prior applications is hereby incorporated by reference in its entirety.

TECHNICAL FIELD

The various aspects and implementations thereof relate to conversion of mechanical energy to electrical energy for electrolysis.

BACKGROUND

Whereas many advocate use of electrical energy to replace home use of natural gas and other fossil fuels, it has become apparent that at many locations, the current capacity of the electricity supply grid is all but sufficient to achieve this ideal of some. Yet, in many urban areas, also a supply grid for natural gas is available and this gas grid may be modified to be used for transportation of hydrogen. This allows for hydrogen to replace natural gas for supply of energy, next to replace grey hydrogen by green hydrogen for industrial use as feedstock and new markets for green hydrogen to replace diesel.

This insight raises the need for efficient generation of hydrogen. In view of carbon based energy sources becoming scarcer, preferably non-carbon related energy generation for hydrogen generation is used. Popular non-carbon energy sources are solar and wind. An issue with these energy sources is that the output power and with that, output power may vary, as output voltage and output current may vary.

SUMMARY

It is preferred to provide a direct current electrical power source arranged to provide a stable and appropriate voltage and current at the core of a hydrogen generator, for example over the membrane of a membrane water electrolysis system. To achieve this, the voltage at the (external) input of an electrolysis system—thus at the output of a DC power supply—may be kept constant, but this appears not to be sufficient for the preferred efficiency level of operation.

A first aspect provides an alternating current AC to direct current DC converting circuit for a turbine generator. The AC to DC converter comprises an active AC/DC converter having a controllable output voltage level having an input for receiving alternating current electrical power from a turbine generator and an output for providing direct current electrical power to an electrolysis system for electrolysis of water. The AC to DC converter further comprises an oscillator for generating an alternating current auxiliary signal and a summation circuit for adding the alternating current signal to the output of the active AC DC converter.

By adding an AC component to the DC output of the active AC DC converter, electrolysis cells in the electrolysis module connected to the AC DC converting circuit have been proven to operate more efficiently. The amplitude of the alternating current auxiliary signal is preferably less than the output voltage of the active AC/DC converter, more preferably less than 20%.

An active AC/DC converter is a converter arranged to converter alternating current electrical power to direct current electrical power, which converter comprises switches, preferably solid state switches like insulated gate base transistors or metal-oxide field effect transistors (IGBTs or MOSFETs), other, or a combination thereof. The switches are switched at a frequency higher than the frequency of the input AC power, preferably at least an order higher. The switching allows to control various parameters, including, but not limited to output voltage, output current and output power.

In a preferred embodiment, the amplitude of the alternating current auxiliary signal is between 1% and 20%, more preferably between 5% and 15% and even more preferably around one tenth of the output voltage of the active AC/DC converter. The waveform of the alternating current auxiliary signal may be a block wave, a sine wave, a saw tooth, a triangular wave, other, or a combination thereof.

An implementation of the AC to DC converting circuit comprises a control unit arranged to control the oscillator to adjust a frequency of the alternating current auxiliary signal. Characteristics of the electrolysis module may vary over time and other relevant characteristics like power level, temperature of the electrolysis module, other, or a combination thereof. These characteristics may influence an optimal amplitude of the alternating current auxiliary signal and this implementation allows for adjustment of the amplitude towards an optimum, optionally based on values of the parameters of the characteristics.

In a further implementation, the control unit is arranged to receive data related to at least one of a state of the electrolysis system and the turbine generator and adjust the level of the output direct current voltage based on the received criteria, other than superposing an alternating current on the output of the AC DC converter. For example, the control unit may be arranged to control the AC to DC converter and to control switches in the AC to DC converter in particular to vary the output voltage and in particular the DC level of the output voltage.

The control of the AC to DC converter and the output voltage may be based on the internal state of at least one of the electrolysis system and the turbine generator. Such state may be described by at least one of an internal impedance of the AC to DC converter, gas pressure in the electrolysis system, temperature of the electrolysis system, lifetime of the electrolysis system, torque and seed of a driving axle of the turbine generator. This implementation and variations or specific implementations thereof may also be implemented in another aspect, without and independent of generating an alternating current signal and superposing this alternating current signal on the DC output power signal.

By adjusting the output voltage of the AC/DC converter and with that, the input voltage to the electrolysis system, the relation between the output voltage of the AC/DC converter and the internal voltage over a membrane or other reaction medium within the electrolysis cell may be determined.

Based on the determined internal voltage or obtained parameters related to the electrolysis module, an optimal voltage within the reactor may be determined as a reference voltage and based on that reference voltage and data related to at least one of a state of the electrolysis system and the turbine generator, an optimal output voltage of the AC/DC converter may be determined.

In another implementation, the control unit is arranged to determine the impedance of the electrolysis system and to control the oscillator frequency as a function of the determined impedance. Alternatively or additionally, the control unit may determine a reactive power demanded by or fed to the electrolysis module and control the frequency based on the determined reactive power in any way, including implementations discussed below.

Implementations may be envisaged with a fixed frequency of the added alternating current signal or a frequency controlled by the control unit based on other parameters.

An imaginary part of the impedance of an electrolysis cell and a water electrolysis cell in particular may vary as a function of frequency. It is, for the electrolysis process and the circuitry around it, preferred to keep the amount of reactive power in the circuitry as small as possible—and hence to keep the imaginary part of the impedance—or reactive power consumed by the electrolysis module—as small as possible.

In another implementation of the AC to DC converting circuit the control unit is arranged to determine whether the impedance of the electrolysis system has an inductive character or a capacitive character, control the oscillator to increase the frequency of the alternating current auxiliary signal if the impedance has a capacitive character; and control the oscillator to decrease the frequency of the alternating current auxiliary signal if the impedance has an inductive character. This embodiment allows for appropriate control of reactive power demanded and consumed by the electrolysis module and is an optional implementation of an implementation wherein the control unit is arranged to control the frequency of the oscillator at a frequency at which a minimum magnitude of the reactive impedance—or the imaginary part of the impedance—is determined.

In particular implementation, the active AC DC converter comprises an AC to DC converter subsystem for converting the alternating current electrical power from the turbine generator to internal direct current electrical power, a DC to DC converter having a controllable output voltage level controllable by the control unit and a DC to AC converter arranged to convert the internal direct current electrical power to output alternating current power at a level, phase and frequency matched to an external grid for providing the output alternating current power to the external grid.

A second aspect provides a power conversion system. The system comprises: a turbine generator and the alternating current AC to direct current DC converting circuit according to the first aspect of which the input is electrically coupled to an electrical output of the turbine generator.

An implementation of the second aspect further comprises an electrolysis system for electrolysis of water electrically coupled to the output of the active AC DC converter.

In another implementation of the power supply system, the electrolysis system comprises at least one electrolysis cell and at least one of a temperature sensor for sensing internal temperature of the electrolysis cell and a pressure sensor for sensing pressure of at least one gas in the electrolysis cell. In this implementation, the at least one of the temperature sensor and the pressure sensor is coupled to the control unit.

BRIEF DESCRIPTION OF THE DRAWINGS

The various aspects and implementations thereof will now be discussed in further detail in conjunction with drawings. In the drawings.

DETAILED DESCRIPTION

Figure 1:
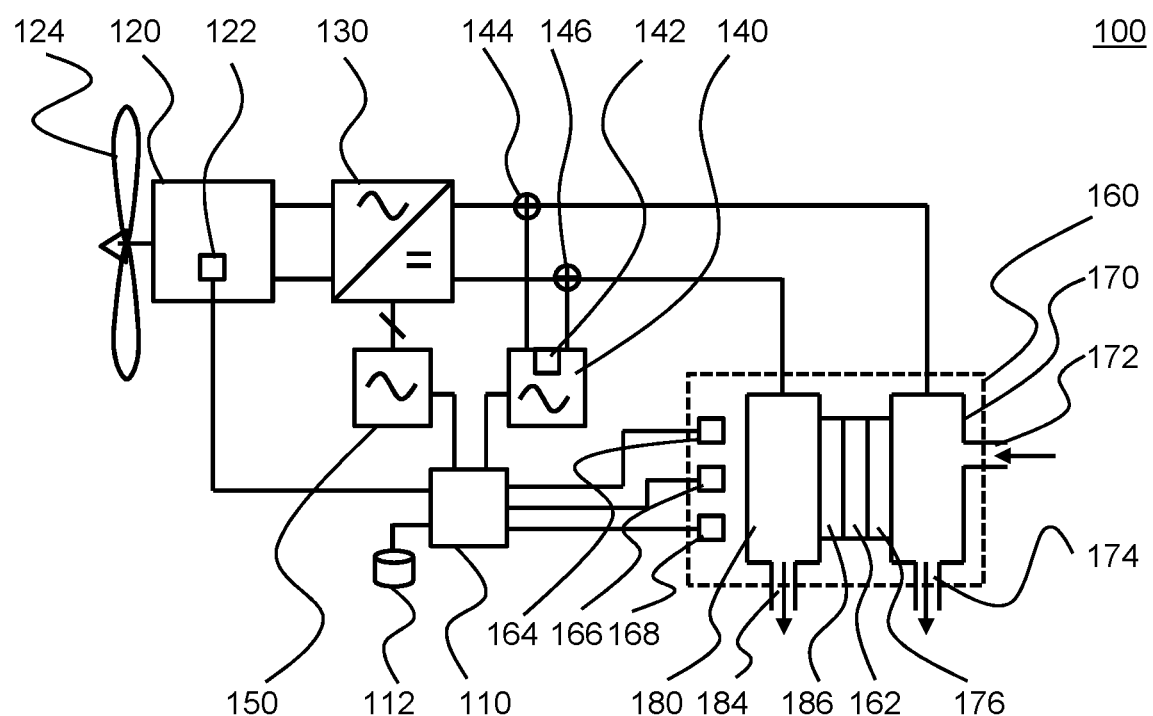
FIG. 1: shows a power conversion system.

FIG. 1 discloses an energy conversion system 100. The energy conversion system 100 comprises a turbine generator 120 connected to a rotor 124 for converting mechanical energy of the rotor 124 rotating to electrical energy. The rotor 124 may be arranged to be rotated by virtue of wind—streaming air—, streaming water or another flowing medium. In another embodiment, the turbine generator may be driven by a combustion engine or another driving system. The turbine generator 120 may be further implemented as any available converter, like an alternator, a dynamo, other, or a combination thereof.

The energy conversion system 100 further comprises an alternating current to direct current converter 130—also referred to as an AC/DC converter 130. The output of the AC/DC converter 130 is coupled to an electrolysis module 160 arranged for electrolysis of water—dihydrogen oxide—, resulting in hydrogen and oxygen. The energy conversion system 100 comprises one or more electrolysis modules that are provided in parallel and/or in series to one another relative to the AC/DC converter 130.

The AC/DC converter 130 is an active AC/DC converter, which means that the output voltage of the AC/DC converter 130 may be adjusted between the passive rectification level and a maximum voltage that is, among others, set by the voltage provided by the turbine generator 120.

Figure 2:
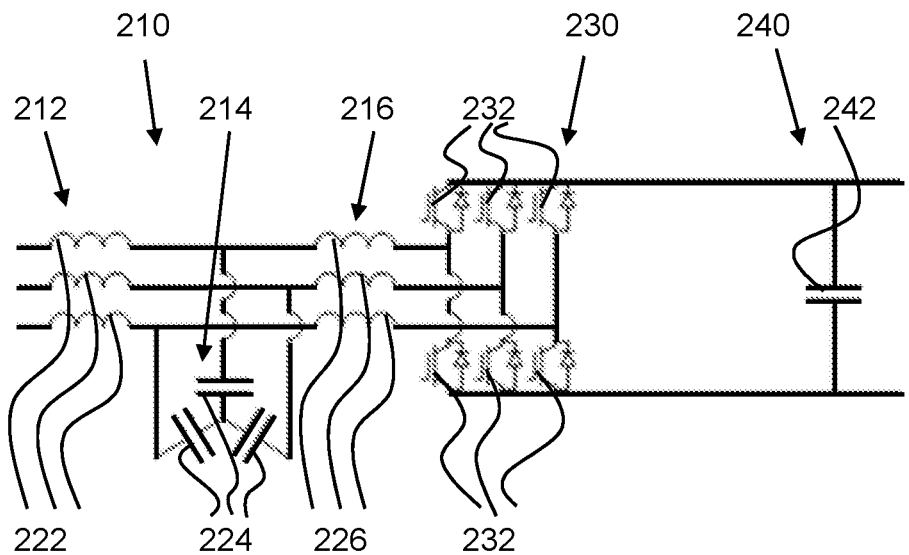
FIG. 2: shows an example of an active AC/DC converter.

FIG. 2 shows an example of the active AC/DC converter 130. The AC/DC converter 130 comprises a full-bridge rectifier 230 provided by six IGBTs 232 as active electronic switches. Instead of IGBTs, also other electronic switches like MOSFETs, other field effect transistors or other types of fully controllable—on and off—semiconductor switches may be used. Between an alternating current source—connected at the left of the scheme shown by FIG. 2—and the rectifier 230, a first pass filter 212 is provided by means of one inductance 222 per phase.

The first pass filter 212 is followed by a second pass filter 214 provided by three capacitances 224 in star configuration between the phases and optionally grounded at the centre of the star and a third filter 216 provided by three inductors. Alternatively, the three capacitances 224 are provided in delta configuration. The second pass filter 214 is followed by a third pass filter 216 provided by three further inductances 226; one per phase. The output of the third pass filter is connected to the rectifier bridge 230. At the output of the AC/DC converter 130, a low-pass filter 240 is provided by means of a further capacitance 242. Whereas the AC/DC converter 130 of FIG. 2 is depicted for handling three phases, other types of AC/DC converters may be envisaged with one, two or more than three phases.

The energy conversion system 100 further comprises a control unit 110 for controlling operation of the energy conversion system 100 and the various elements thereof. The control unit 110 is coupled to a control memory 112. The control memory 112 is arranged to store computer executable code for programming the control unit 110 to enable the control unit 110 to control the power conversion system 100 or at least part thereof. The control memory 112 is further arranged to store reference data that allows the control unit 110 to interpret sensor data and use the interpreted sensor data or other sensor data to control the power conversion system and particular parts thereof.

The control unit 110 is connected to an IGBT driver 150 for controlling switching of the IGBTs 232 or other electronic switches of the AC/DC converter 130.

The control unit 110 is further connected to a turbine sensor 122 provided in the turbine generator 120 for receiving data on torque and rotational speed of the axis of the turbine generator 120. The torque may be measured as the actual torque on the rotor 124, but preferably, the torque on the rotor 124 is determined based on current and voltage received by or from the AC/DC converter 130 and data on the turbine generator 120 that may be stored in the control memory 112.

The control unit 110 is further connected to a pressure sensor 164 for monitoring pressure in the electrolysis module 160 and hydrogen pressure in particular, a temperature sensor 166 for monitoring temperature in the electrolysis module 160 and an impedance sensor 168 for measuring impedance of the electrolysis module 160. Additionally, the control unit 110 may receive data on a speed of wind acting on the rotor 124.

The electrolysis module 160 comprises a cathode 180 connected to a negative side of the AC/DC converter 130 and an anode 170 connected to a positive side of the AC/DC converter 130. Water is provided to the anode 170 through an anode inlet 172 and hydrogen is provided by the cathode 180 as a result of operation via a cathode outlet 184. Between the anode 170 and the cathode 180, a membrane 162 is provided. At the anode side of the membrane 162, an anode reaction space 176 is provided and at a cathode side of the membrane 162, a cathode reaction space 186 is provided.

In the implementation shown by FIG. 1, water is provided to the anode 170, as is common with membrane electrolysers. In another implementation, solid oxide electrolysers may be used, in which case water is provided to the cathode 180.

In operation, the rotor 124 rotates by virtue of wind, water or another external force and drives the turbine generator 120 which, in turn provided electrical energy by means of an alternating current. The alternating current is transformed to direct current electrical power by means of the AC/DC converter 130 and provided to the electrolysis module 160 for generating hydrogen.

The power conversion system 100 further comprises an alternating current signal source 140 connected to the output of the AC/DC converter by a summation circuit comprising a first summation element 146 and a second summation element 144. In another embodiment, only one summation element is provided. The alternating current signal source 140 is connected to the control unit 110 and the control unit 110 is arranged to control frequency and amplitude of an alternating current power signal to be added to the output of the AC/DC converter 130.

The alternating current signal source 140 comprises a reactive power monitor 142 for measuring reactive power provided by the alternating current signal source 140 or for measuring a phase difference between current and voltage of the alternating current power signal provided by the alternating current signal source 140.

At lower frequencies, the electrolysis module 160 has an capacitive character and at higher frequencies, the electrolysis module 160 has a inductive character. In both cases, the electrolysis module 160 consumes reactive power. This consumption of reactive power is undesired, as it may result in high currents that require robuster design of the power conversion system 100.

Figure 3:
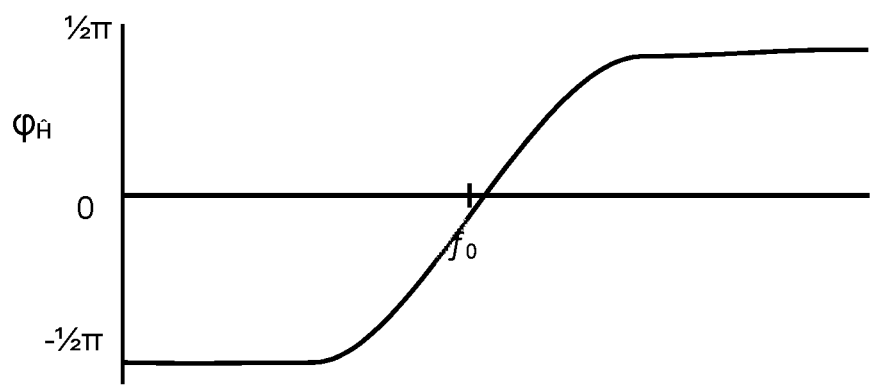
FIG. 3: shows a schematic representation of phase/frequency of a water electrolysis cell.

FIG. 3 schematically shows a phase-frequency characteristic of the electrolysis module 160: at frequencies below f0, the phase shift is negative and at frequencies below f0, the phase shift is positive. The reactive power monitor 142 is arranged to monitor, over the operating frequencies of the alternating current signal source 140, what operating frequency matches f0 best, i.e. at what frequency the phase shift is lowest. With this information, the control unit 110 is arranged to operate the alternating current signal source 140 at a frequency at which the phase shift is as small as possible. Otherwise state, the alternating current signal source 140 preferably operates at a frequency at which the imaginary part of the impedance of the electrolysis module 160 is as low as possible. Alternatively or additionally, this control functionality is provided within the alternating current signal source 140.

The frequency of f0 preferably lies between 51 102 Hz and 2 103 Hz, more preferably between 7.5·102 Hz and 1.5·103 Hz and even more preferably between 9·102 Hz and 1.1 103 Hz. In other embodiments, the frequency of f0 may lie lower, between 5·101 Hz and 1.5·102 Hz, preferably between 8·101 Hz and 1.2·102 Hz and more preferably between 9·101 Hz and 1.1·102 Hz. In further embodiments, f0 lies in same ranges around 2·102 Hz, 3·102 Hz, 4·102 Hz, 4·102 Hz, 5·102 Hz, 6·102 Hz, 7·102 Hz, 8·102 Hz, 9·102 Hz, depending on the design of the electrolyser cells of the electrolysis module 160, The amplitude of the signal provided by the alternating current signal source 140 is preferably a tenth of the value of the signal provided by the AC/DC converter 130 in terms of voltage.

Figure 4:
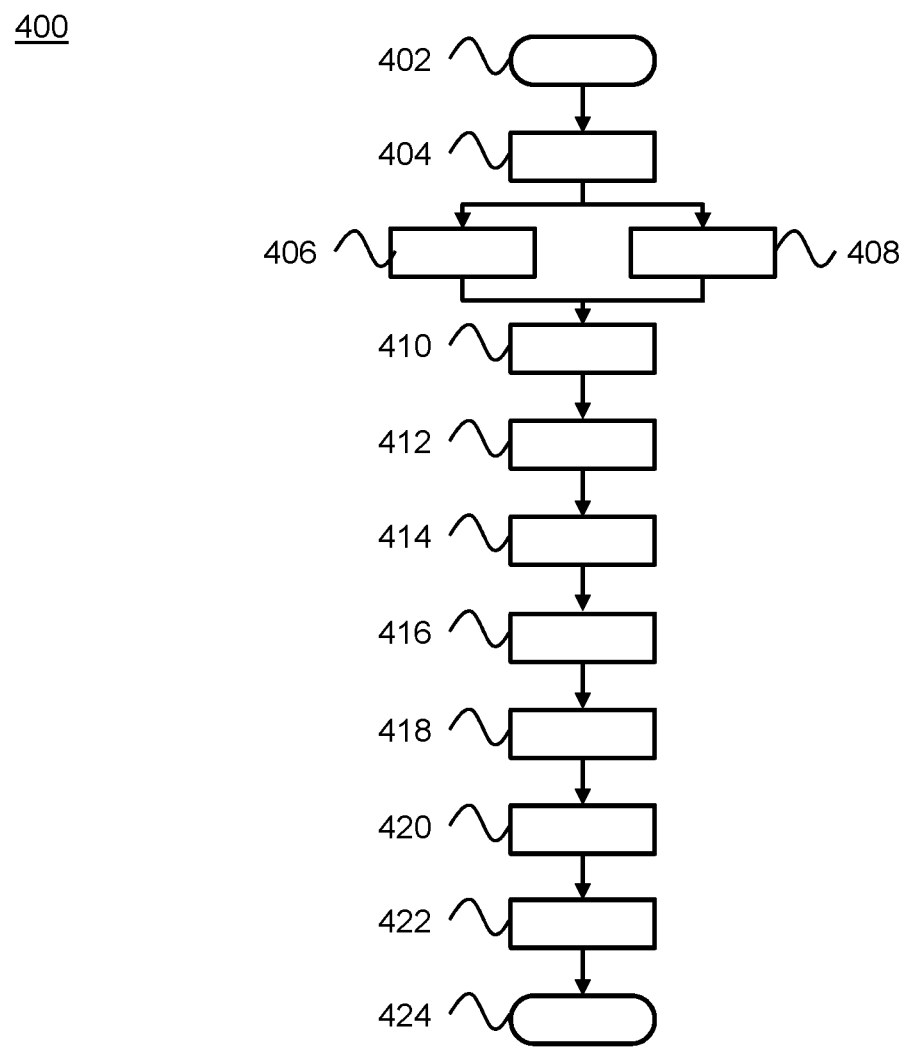
FIG. 4: shows a flowchart.

The operation of the power conversion system 100 will be discussed below in further detail in conjunction with a flowchart 400 shown by FIG. 4. The various parts of the flowchart 400 are briefly summarised below:

402 initialise system
404 obtain impedance of the electrolysis module;
406 adjust output voltage
408 adjust frequency
410 obtain temperature of the electrolysis module
412 adjust output voltage;
414 obtain hydrogen pressure in the electrolysis module;
416 adjust output voltage;
418 obtain torque of the turbine generator axis;
420 adjust output voltage;
422 switch electrolyser connections;
424 end procedure (return to start)

The procedure starts in a terminator 402 in which various parts of the power conversation system 100 are initialised. In step 404, the impedance of the electrolysis module 160 is obtained. This impedance may be obtained by means of the reactive power monitor 142 or the impedance sensor 168. Alternatively or additionally, the impedance or at least the resistance—real part of the impedance—of the electrolysis module 160 is obtained using data on the lifetime of the electrolysis module 160.

The lifetime data may be monitored by means of the control unit 110, using for example an internal clock. Reference data like a table stored in the control memory 112 on a relation between age and internal resistance of the electrolysis module 160 may be looked up to determine the actual internal resistance.

The internal resistance of the electrolysis module 160 increase with lifetime, which means that in order to keep the voltage across the membrane 162 at substantially the same level that is required for the electrolysis, the external voltage is to be increased. This external voltage is determined by the output voltage of the AC/DC converter 130. In step 406, the output voltage of the AC/DC converter 130 is adjust to compensate for any increase of internal resistance of the electrolysis module 160.

In step 408, the frequency of the alternating current signal source 140 is adjusted as discussed above, to arrive at an imaginary part of the operating impedance of the electrolysis module 160 that is as small as possible.

In step 410, temperature of the electrolysis module 160 is obtained, preferably by means of the temperature sensor 166. Based on the obtain data, optionally using reference data stored in the control memory 112, the AC/DC converter 130 is controlled to adjust the output voltage accordingly in step 412. If the temperature has increased compared to a previous period, the output is increased and if the temperature has decreased compared to a previous period, the output voltage is decreased.

In step 414, pressure of hydrogen in the electrolysis module 160 is obtained. This pressure may obtained at the output 174, in the anode reaction space 176 near the membrane, at another location of a combination thereof. Additionally or alternatively, pressures of other gases—oxygen, steam—in the electrolysis module 160 may obtained. Based on the obtain data, optionally using reference data stored in the control memory 112, the AC/DC converter 130 is controlled to adjust the output voltage accordingly in step 416. If the pressure has increased compared to a previous period, the output voltage is increased and if the pressure has decreased compared to a previous period, the output voltage is decreased.

In step 414, pressure of oxygen in the electrolysis module 160 is obtained. This pressure may obtained at the output 174, in the anode reaction space 176 near the membrane, at another location of a combination thereof. Additionally or alternatively, pressures of other gases in the electrolysis module 160 may obtained. Based on the obtain data, optionally using reference data stored in the control memory 112, the AC/DC converter 130 is controlled to adjust the output voltage accordingly in step 416. If the pressure has increased compared to a previous period, the output is increased and if the pressure has decreased compared to a previous period, the output voltage is decreased.

In step 418, torque on the turbine generator axis is obtained. Based on the obtained data, optionally using reference data stored in the control memory 112, the AC/DC converter 130 is controlled to adjust the output voltage accordingly in step 420. The output voltage is controlled such that the voltage over the membrane 162 is kept or set at a preferred level. As an increased torque may lead to increased current through the system, there will be an increased voltage of an internal resistance of the electrolysis module, resulting in a lower voltage over the membrane 162. To keep the voltage over the membrane 162 at the appropriate level, the output voltage of the AC/DC converter 130 may be increased in step 422 if the torque on the turbine generator axis increases.

The torque of the rotor 124 of the turbine generator 120 depends on the current and voltage taken up and provided by the AC/DC converter 130, thus the total power in the end consumed by the electrolysis module 160. For the turbine generator 120, based on parameters of the turbine itself, as well as the rotor 124 and, optionally, of other components of the system 100, also a maximum rotational speed of the rotor 124 and/or a preferred range of rotational speed may be set. Based on a given speed of the wind and system parameters, this maximum speed and/or speed range may be translated to a desired torque or desired torque range, for a particular value of the speed of the wind.

Based on this determined torque or torque range, in turn, a power may be determined to be taken from the AC/DC converter; power is the product of torque and angular speed.

The electrolysis module 160 may comprise one or more electrolysis cells, provided in series with or parallel to the AC/DC converter 130 or a combination thereof. Such configuration has influence of the voltage to be provided to the electrolysis module 160. Furthermore, electrolysis cells may be changed and different electrolysis cells may have different internal impedances or may require different voltages across their membranes. To address this, the control memory 112 may have stored in it a reference voltage that is to be applied across the membrane 162 and using data obtained by the various sensors, a desired output voltage of the AC/DC converter 130 is determined by the control unit 110.

In order to match power that needs to be taken from the turbine generator for a desired torque thereof and to be consumed by the electrolysis module 160, the AC/DC converter 130 and the switching of the various electrolysis cells in the electrolysis module 160 may be switched such that each electrolysis cell has the appropriate voltage applied across the membrane 162 of each cell. The various electrolysis cells may be switched in step 422 from serial to parallel configuration and some cells may be switch on or off to ensure an appropriate voltage across each of the membranes of the electrolysis cells and the appropriate power to be taken up by the electrolysis module 160.

In terminator 424, the adjustment procedure ends. Preferably, the procedure as depicted by the flowchart 400 is carried out again, optionally after passing through a waiting loop.

Figure 5:
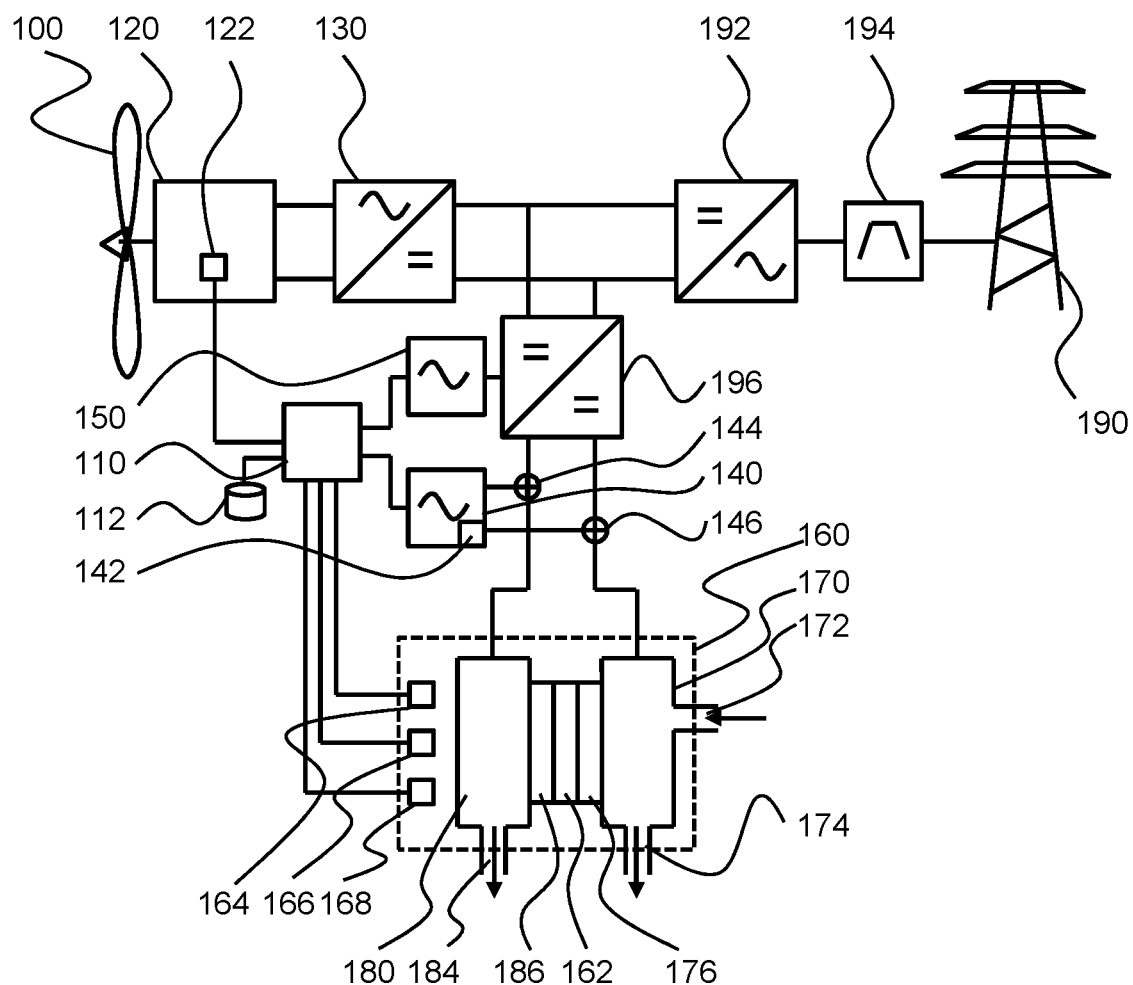
FIG. 5: shows a further power conversion system.

FIG. 5 depicts a further power conversion system 500. The further power conversion system 500 comprises the same elements as the power conversion system 100. These elements are referenced by means of the same reference numerals, arranged to provide the same functionality as discussed above and not discussed in further detail again in conjunction with FIG. 5.

In the embodiment according to FIG. 5, the AC/DC converter 130 may be implemented using a passive rectifying module. To the output of the AC/DC converter 130, a direct current to direct current converter 196—DC/DC converter—may be connected. The DC/DC converter 196 may be controlled, by the control unit 110, to provide an output voltage at a particular level, suitable for providing an appropriate voltage to the electrolysis system 160.

To the output of the AC/DC converter 130, also a direct current to alternating current converter 192—DC/AC converter—is provided. The DC/AC converter 196 may be controlled by the control unit 110 or by another control unit (not shown). The output of the DC/AC converter 196 may be connected to a large area or local power grid 190, optionally via a bandpass filter 194 or other filter to remove any low or high frequency components—for example other than 50 Hz or 400 Hz (for aviation purposes)—from the signal generated by the DC/AC converter 192.

The further power conversion system 500 allows power generated by the turbine generator 120 to be distributed to the electrolysis module 160 and/or the power grid 190 and determine a ratio between both, depending on power supplied by the turbine generator 120 and the demand by the power grid 190. If the demand by the power grid 190 is low, most power generated by the turbine generator 120 may be provided to the electrolysis system 160. In yet further embodiments, another power supply module, for example fuel cell or a fuel cell system comprising multiple fuel cells, a solar power plant, another turbine generator, other, or a combination thereof, may be added to the further power conversion system 500 to provide additional electrical power to the further power conversion system 500 to be distributed.

The invention claimed is:

1. An alternating current AC to direct current DC converting circuit for a turbine generator, comprising:
an active AC/DC converter having a controllable output voltage level having an input for receiving alternating current electrical power from the turbine generator and an output for providing direct current electrical power to an electrolysis system for electrolysis of water;
an oscillator for generating an alternating current auxiliary signal; and
a summation circuit for adding the alternating current auxiliary signal to the output of the active AC/DC converter.

2. The AC to DC converting circuit according to claim 1, further comprising a control unit arranged to control the oscillator to adjust a frequency of the alternating current auxiliary signal.

3. The AC to DC converting circuit according to claim 2, wherein the control unit is arranged to determine the impedance of the electrolysis system and to control the oscillator frequency as a function of the determined impedance.

4. The AC to DC converting circuit according to claim 3, wherein the control unit is arranged to control the frequency of the oscillator at a frequency at which a minimum reactive impedance is determined.

5. The AC to DC converting circuit according to claim 4, wherein the control unit is arranged to:
determine whether the impedance of the electrolysis system has an inductive character or a capacitive character;
control the oscillator to decrease the frequency of the alternating current auxiliary signal if the impedance has the inductive character; and
control the oscillator to increase the frequency of the alternating current auxiliary signal if the impedance has the capacitive character.

6. The AC to DC converting circuit according to claim 1, wherein the voltage amplitude of the alternating current auxiliary signal is between 1% and 20% of the output voltage of the active AC/DC converter.

7. The AC to DC converting circuit according to claim 6, further comprising a control unit arranged to control the oscillator to adjust a frequency of the alternating current auxiliary signal, wherein the control unit is arranged to control the voltage amplitude of the alternating current auxiliary signal.

8. The AC to DC converting circuit according to claim 7, wherein the control unit is arranged to control the voltage amplitude of the alternating current auxiliary signal as a function of the output voltage of the active AC/DC converter.

9. The AC to DC converting circuit according to claim 3, wherein the control unit is arranged to obtain data on internal impedance of the electrolysis system and the control unit is arranged to increase the level of the direct current output voltage of the active AC/DC converter if the internal impedance of the electrolysis system increases.

10. The AC to DC converting circuit according to claim 3, wherein the control unit is arranged to:
obtain operation age of the electrolysis system
obtain data on a relation between internal impedance of the electrolysis system and the age of the electrolysis system; and
determine the internal impedance of the electrolysis system based on the obtained data.

11. The AC to DC converting circuit according to claim 1, wherein the control unit is arranged to receive data on gas pressure in the electrolysis system and to increase the direct current output voltage of the active AC/DC converter if the gas pressure increases of time and the decrease the level of the output voltage if the gas pressure decreases over time.

12. The AC to DC converting circuit according to claim 2, wherein the control unit is arranged to obtain data on internal temperature of the electrolysis system and the control unit is arrange to increase the output level of the direct current output voltage of the active AC/DC converter if the internal temperature of the electrolysis system increases.

13. The AC to DC converting circuit according to claim 2, wherein the control unit is arranged to obtain data on the torque on a driving axle of the turbine generator and the control unit is arrange to increase the output level of the direct current voltage of the active AC/DC converter if the torque of the driving axle increases.

14. The AC to DC converting circuit according to claim 3, wherein the control unit is arranged to obtain a reference voltage and the control unit is arrange to control the output voltage based on the reference voltage.

15. The AC to DC converting circuit according to claim 1, wherein the active AC/DC converter comprises:
an AC to DC converter subsystem for converting the alternating current electrical power from the turbine generator to internal direct current electrical power;
a DC to DC converter having a controllable output voltage level controllable by the control unit; and
a DC to AC converter arranged to convert the internal direct current electrical power to output alternating current power at a level, phase and frequency matched to an external grid for providing the output alternating current power to the external grid.

16. A power supply system comprising:
a turbine generator; and
the alternating current AC to direct current DC converting circuit according to claim 1 of which the input is electrically coupled to an electrical output of the turbine generator.

17. The power supply system according to claim 16, further comprising an electrolysis system for electrolysis of water electrically coupled to the output of the active AC/DC converter.

18. The power supply system according to claim 16, wherein:
the alternating current AC to direct current DC converting circuit comprises a control unit arranged to receive data related to at least one of a state of the electrolysis system and the turbine generator and adjust the output voltage based on the received data; and
the electrolysis system comprises at least one electrolysis cell and at least one of:
a temperature sensor for sensing internal temperature of the electrolysis cell; and
a pressure sensor for sensing pressure of at least one gas in the electrolysis cell;
wherein the at least one of the temperature sensor and the pressure sensor is coupled to the control unit.

* * * * *